(12) United States Patent
Zhai et al.

(10) Patent No.: US 9,755,970 B2
(45) Date of Patent: Sep. 5, 2017

(54) INFORMATION PROCESSING METHOD, DEVICE AND SYSTEM

(71) Applicant: ZTE CORPORATION, Shenzhen, Guangdong Province (CN)

(72) Inventors: Hongjun Zhai, Shenzhen (CN); Mingjiang Cheng, Shenzhen (CN); Ting Liao, Shenzhen (CN)

(73) Assignee: ZTE CORPORATION (CN)

( * ) Notice: Subject to any disclaimer, the term of this patent is extended or adjusted under 35 U.S.C. 154(b) by 111 days.

(21) Appl. No.: 14/401,661

(22) PCT Filed: May 15, 2013

(86) PCT No.: PCT/CN2013/075633
§ 371 (c)(1),
(2) Date: Nov. 17, 2014

(87) PCT Pub. No.: WO2013/170746
PCT Pub. Date: Nov. 21, 2013

(65) Prior Publication Data
US 2015/0139233 A1 May 21, 2015

(30) Foreign Application Priority Data
May 18, 2012 (CN) .......................... 2012 1 0156195

(51) Int. Cl.
H04L 12/741 (2013.01)
H04L 12/46 (2006.01)
(Continued)

(52) U.S. Cl.
CPC .......... *H04L 45/74* (2013.01); *H04L 12/4641* (2013.01); *H04L 45/02* (2013.01);
(Continued)

(58) Field of Classification Search
CPC ....... H04L 12/741; H04L 12/18; H04L 12/26; H04L 12/4641; H04L 45/66; H04L 45/74;
(Continued)

(56) References Cited

U.S. PATENT DOCUMENTS

2011/0235523 A1 9/2011 Jha
2012/0320800 A1* 12/2012 Kamble .................. H04L 45/66
370/255

FOREIGN PATENT DOCUMENTS

CN 102075446 5/2011
CN 102130812 7/2011
(Continued)

OTHER PUBLICATIONS

Perlman et al., RFC 6325 "Routing Bridges (RBridges): Base Protocol Specification", Jul. 2011.*
(Continued)

Primary Examiner — Jae Y Lee
Assistant Examiner — Aixa Guadalupe-Cruz
(74) Attorney, Agent, or Firm — McAndrews, Held & Malloy, Ltd.

(57) ABSTRACT

A method for processing information is provided. The method includes: a first member in an equipment group learns forwarding information when forwarding traffic, wherein an ESADI instance based on the equipment group is created on each member in the equipment group; when learning new forwarding information, the first member generates an ESADI frame by utilizing the ESADI instance created thereon, wherein the ESADI frame carries the new forwarding information; and the first member transmits the ESADI frame to a TRILL network where it is.

17 Claims, 4 Drawing Sheets

(51) Int. Cl.
  *H04L 12/721* (2013.01)
  *H04L 12/751* (2013.01)
  *H04L 12/709* (2013.01)

(52) U.S. Cl.
  CPC ............ *H04L 45/66* (2013.01); *H04L 45/245* (2013.01); *H04L 45/32* (2013.01)

(58) Field of Classification Search
  CPC ..... H04L 45/02; H04L 45/586; H04L 45/245; H04L 41/0654; H04L 45/28; H04L 45/32
  See application file for complete search history.

(56) References Cited

FOREIGN PATENT DOCUMENTS

| | | |
|---|---|---|
| CN | 102244614 | 11/2011 |
| CN | 102710510 | 10/2012 |

OTHER PUBLICATIONS

International Search Report for International Patent Application No. PCT/CN2013/075633 mailed Aug. 8, 2013.
Communication with Supplementary European Search Report dated Nov. 27, 2015 corresponding to European Patent Application No. 13791277.0.
Hongjun Zhai, Fangwei Hu, Radia Perlman, Donald Eastlake, Huawei: "TRILL: The ESADI Protocol; draft-hu-trill-rbridge-esadi-03.txt", TRILL: The ESADI Protocol; Draft-Hu-TRILL-RBridge-ESADI-03.txt, Internet Engineering Task Force, IETF; Standard Working Draft, Internet Society (ISOC) 4, Rue Des Falaises CH—1205, Geneva, Switzerland, Mar. 12, 2012 (Mar. 12, 2012), pp. 1-20, XP015081785.
Mingui Zhang, Donald Eastlake, Huawei: "RBridge Aggregation; draft-zhang-trill-aggregation-02.txt", RBridge Aggregation; Draft-Zhang-TRILL-Aggregation-02.txt, Internet Engineering Task Force, IETF; Standard Working Draft, Internet Society (ISOC) 4, Rue Des Falaises CH—1205 Geneva, Switzerland, May 3, 2012 (May 3, 2012), pp. 1-13, XP015082707.
HJ Zhai, XH Dai, ZTE Corporation: "RBridge: ESADI-Extension; draft-zhai-trill-esadi-extension-for-rbv-0 0.txt". RBridge: ESADI-Extension; Draft-Zhai-TRILL-ESADI-Extension-for-RBV-0 0.txt. Internet Engineering Task Force IETF; Standard Working Draft, Internet Society (ISOC) 4. Rue Des Falaises CH—1205 Geneva. Switzerland, Oct. 8, 2012 (Oct. 8, 2012). pp. 1-11, XP015085633.
H Zhai, F Hu, R Perlman, Intel Labs, D Eastlake 3rd, Huawei H: "RBridge: Pseudo-Nickname; draft-hu-trill-pseudonode-nickname-02.txt" RBridge: Pseudo-Nickname; Draft-Hu-TRILL-Pseudonode-Nickname-02.txt, Internet Engineering Task Force. IETF; Standard Working Draft, Internet Society, (ISOC) 4. Rue Des Falaises CH—1205 Geneva. Switzerland, May 15, 2012 (May 15, 2012). pp. 1-12, XP015082865.

\* cited by examiner

INFORMATION PROCESSING METHOD, DEVICE AND SYSTEM

CROSS-REFERENCE TO RELATED APPLICATIONS/INCORPORATION BY REFERENCE

This application is a 371 of International Patent Application No. PCT/CN2013/075633, filed May 15, 2013, which claims priority to Chinese Patent Application No. 201210156195.X, filed May 18, 2012, entitled "INFORMATION PROCESSING METHOD, APPARATUS AND SYSTEM". The above-identified applications are hereby incorporated herein by reference in their entirety.

FIELD OF THE INVENTION

The disclosure relates to the field of communication, in particular to an information processing method, device and system.

BACKGROUND OF THE INVENTION

Transparent Interconnection over Lots of Links (TRILL) is a Layer-2 (L2) network standard recommended by the Internet Engineering Task Force (IETF), and is adopted to overcome a shortcoming of a Spanning Tree Protocol (STP) in a large Data Center (DC). In an L2 network, the STP avoids a loop by blocking a redundant link, but also causes the bandwidth waste (blockage) of the redundant link. A TRILL network solves the problem of L2 loops by introducing an Intermediate System to Intermediate System (IS-IS) routing protocol into the L2 network, and meanwhile, L2 multiple path (or called Equivalent Cost Multiple Path (ECMP)) is reserved.

In the TRILL network, equipment running a TRILL protocol is called a Routing Bridge (RBridge) which is uniquely identified by a Nickname. At the ingress of the TRILL network, the RBridge responsible for encapsulating an original data frame of an End Station into a TRILL format (that is, a TRILL header and an external frame header are added in front of the original data frame, and the TRILL header mainly includes Nicknames and hop numbers of the RBridges at the ingress and egress of the TRILL network) and inputting the TRILL data frame into the TRILL network is called an ingress RBridge, Ingress for short; and at the egress of the TRILL network, the RBridge responsible for decapsulating the TRILL data frame into the original data frame and forwarding the original data frame to the End Station is called an egress RBridge, Egress for short, and meanwhile, the Egress can also learn about that the original data frame is imported into the TRILL network from which Ingress and form a Media Access Control (MAC) information table {D_MAC, Ingress_ Nickname, . . . }. Because being located on an edge part in the TRILL network, the Ingress and Egress RBridges are also called Edge RBridges.

In order to avoid the loop, on a border of the TRILL network, service can be provided for an end system by only one RBridge in any Virtual Local Area Network (VLAN), and the RBridge is called a service provider of the end system, such as a VLAN-x Appointed Forwarder (AF) on a shared link. Such a regulation can effectively avoid the loop, but also causes some problems, for instance, the switching of the AF on the shared link causes the flip-flop of Ingress-_Nickname in some MAC entries on a far-end Egress; and in case of multi-homing of the end system to multiple RBridges through point-to-point links (for instance, a Link Aggregation Group (LAG)), in order to avoid the flip-flop of MAC on the far-end. RBridge, the links can only work in an Active-Standby mode to cause bandwidth waste and a difficulty in meeting the requirements of high throughput and high reliability of a high-performance DC.

Thus a TRILL working team puts forwards the concept of RBridge Group (RBG) or Virtual RBridge (RBv). In an RBG, a Nickname called a group Nickname is shared by members, and the RBv members notify own Group Nickname in the TRILL network to help other RBridges to calculate paths leading to the RBv. When a data frame is forwarded, the member RBridges finish the TRILL encapsulation of original data by virtue of the group Nickname rather than own equipment Nickname, so that the regulation is broken and the problem of flip-flop is solved.

After the introduction of the concept of RBv, the far-end RBridge can reach the RBv through multiple member RBridges. Traffic between the RBv and the far-end RBridge in different directions is input into and output from the TRILL network through different member RBridges. FIG. 1 is a schematic diagram of different forwarding paths of the RBv members for messages between host computers according to a related art, and as shown in FIG. 1, for example, traffic from H1 to H2 reaches H2 through RB1→ . . . →RB3 in FIG. 1 (it is supposed that the traffic is allocated to RB1 in a payload allocation way through Short Waves (SW)), and traffic from H2 to H1 reaches H1 through RB3→ . . . →RB2 (it is supposed that a path from RB3 to RB2 is superior to that from RB3 to RB1), so that forwarding information which can reach H2 through RB3 cannot be acquired by RB1 in a self-learning manner. Under the condition that RB1 does not know how to reach. H2, RB1 will encapsulate a data frame transmitted from H1 to H2 in form of unknown (destination) unicast frame, and multicasts the traffic in the TRILL network.

The above-mentioned multicast forwarding manner causes the arrival of the H1→H2 traffic at the irrelevant RB5, which leads to network bandwidth waste and consumption on a part of message processing resources of RB3. In case of heavy traffic from H1 to H2, the problems of bandwidth waste, consumption on the message processing resources and the like, which are caused by the loss of the forwarding information, are unbearable. In order to solve the problems, an efficient MAC information sharing mechanism among the member RBridges is required.

Although providing a way of rapidly notifying MAC address information among different RBridges, an End Station Address Distribution Information (ESADI) protocol only allows the notification of a local MAC address at present, that is, the RBridges can reach an MAC address of the end system without the other RBridges. Besides local MAC address information, far-end MAC information is also required to be shared among the RBv members and learnt by the members, that is, the RBridges can reach the MAC address of the end system only through the other RBridges. Therefore, the conventional ESADI protocol cannot meet the requirement of information sharing among the RBv members.

The introduction of an RBv group is mentioned in the related art, and after the RBv group is introduced, the member RBridges must share acquired information such as the MAC address information to one another in the group to enable the members to better provide service for the end system, for example, when message forwarding service is provided for the end system across the TRILL network, unnecessary multicast forwarding of an unknown unicast message is avoided. At present, the prior art is unsuitable for intra-group information sharing such as MAC information sharing. In the TRILL network, a MAC address information format on the Edge RBridge is different from that in a conventional network (for example, the far-end MAC information additionally has a Nickname field of the egress RBridge), so that the problem of MAC address between RBvs cannot be solved by the prior art. The conventional VLAN-granularity-based ESADI cannot ensure to control a sharing range of the MAC address information and an Operation Administration Maintenance (OAM) message within the group.

For the problem that the conventional ESDAI protocol cannot meet the requirement of information sharing among RBv members in the related art, there is no effective solution yet.

SUMMARY OF THE INVENTION

The invention provides a method, device and system for processing information, so as to at least solve the problem that a conventional ESADI protocol cannot meet the requirement of information sharing among RBv members.

According to one aspect of the invention, an information processing method is provided, including that: a first member in an equipment group learns forwarding information when it forwards traffic, wherein an ESADI instance based on the equipment group has been created on each member in the equipment group; when learning new forwarding information, the first member generates an ESADI frame by utilizing the ESADI instance created on the first member, wherein the ESADI frame carries the new forwarding information; and the first member transmits the ESADI frame to a TRILL network in which the first member is located.

After the first member transmits the ESADI frame to the TRILL network, the method further includes that: other members in the same equipment group with the first member in the TRILL network receive the ESADI frame; and the other members process the ESADI frame to learn the new forwarding information according to ESADI instance based on the equipment group.

A specific Identifier (ID) is set in a frame header of the ESADI frame, wherein the specific ID is used for indicating that the ESADI frame is only used for the group-based ESADI instance.

When the specific ID is a VLAN ID field in the frame header of the ESADI frame, a value of the specific ID is 0xFFF or 0x000.

The ESADI frame carries an equipment group ID, wherein the equipment group ID is used for indicating that the payload information of the ESADI frame can be shared in the equipment group identified by the equipment group ID.

The new forwarding information is stored in the payload information of the ESADI frame in a Type-Length-Value (TLV) format.

The new forwarding information includes: MAC information and/or an OAM message.

When the new forwarding information is the MAC information, the first member sets an equipment ID field in the payload information to be a Nickname of an egress RBridge with the MAC information.

When the Nickname is 0, the first member directly reaches the equipment represented by the MAC information without passing through the other RBridges.

When the new forwarding information is the OAM message, the first member places a TRILL header in the OAM message and a subsequent content of the TRILL header in the OAM message in the payload information.

The equipment group is an RBv, or a logic unit consisting of a plurality of RBridges.

According to another aspect of the invention, an information processing method is provided, including that: other members in an equipment group receive an ESADI frame from a first member in the same equipment group, wherein an ESADI instance based on the equipment group is created on each member in the equipment group, the first member generates the ESADI frame by utilizing the ESADI instance created thereon, and the ESADI frame carries new forwarding information learnt by the first member; and the other members transmit the ESADI frame to the ESADI instance based on the equipment group for processing to learn the new forwarding information.

That the other members transmit the ESADI frame to the ESADI instance based on the equipment group for processing includes that: the other members determine the equipment-group ESADI instance according to a specific ID and an equipment group ID in payload information in the ESADI frame; and the other members transmit the ESADI frame to the determined ESADI instance for processing.

According to another aspect of the invention, an information processing device is provided, which is located on a member in an equipment group, wherein an ESADI instance based on the equipment group is created on each member in the same equipment group, the device including: a first learning module, configured to learn forwarding information when forwarding traffic; a generation module, configured to, when the first learning modules learns new forwarding information, generate an ESADI frame by utilizing the locally created ESADI instance, wherein the ESADI frame carries the new forwarding information; and a transmission module, configured to transmit the ESADI frame generated by the generation module to a TRILL network in which the first member is located.

According to another aspect of the invention, an information processing device is provided, which is located on another member except a first member in an equipment group, wherein an ESADI instance based on the equipment group is created on each member in the same equipment group, the device including: a receiving module, configured to receive an ESADI frame from the first member, wherein the first member generates the ESADI frame by utilizing the ESADI instance created thereon, and the ESADI frame carries new forwarding information learnt by the first member; and a second learning module, configured to transmit the ESADI frame to the equipment-group-based ESADI instance for processing to learn the new forwarding information.

According to another aspect of the invention, an information processing system is provided, including: a first member in an equipment group, configured to learn forwarding information when forwarding traffic, an ESADI instance based on the equipment group has been created on each member in the equipment group, generate an ESADI frame by utilizing the ESADI instance created thereon when learning new forwarding information, the ESADI frame carrying the new forwarding information, and transmit the ESADI frame to a TRILL network where it is; and other members in the same equipment group with the first member, configured to receive the ESADI frame from the first member and transmit the ESADI frame to the equipment-group-based ESADI instance for processing to learn the new forwarding information.

In the embodiments of the invention, the equipment-group-based ESADI instance rather than a VLAN-based ESADI instance in a related art is created on each member in the equipment group, the first member generates the ESADI frame by utilizing the ESADI instance created thereon after learning the forwarding information, and transmits the generated ESADI frame to the TRILL network, and the forwarding information learnt by the first member is flooded into the network for the other members in the equipment group to learn by virtue of the ESADI frame, so that the aim of sharing the forwarding information among all the members in the equipment group is fulfilled.

BRIEF DESCRIPTION OF THE DRAWINGS

The drawings are described here to provide further understanding of the invention, and form a part of the invention. The schematic embodiments and description of the invention are adopted to explain the invention, and do not form improper limits to the invention. In the drawings.

DETAILED DESCRIPTION OF THE EMBODIMENTS

The invention is described below with reference to the drawings and the embodiments in detail. It is important to note that the embodiments of the invention and the characteristics in the embodiments can be combined under the condition of no conflicts.

In a related art, although providing a way of rapidly notifying MAC address information among different RBridges, an ESADI protocol only allows the notification of a local MAC address at present, that is, the RBridges can reach an MAC address of an end system without passing through the other RBridges, Besides local MAC address information, far-end MAC information is also required to be shared among the RBv members and learnt by the members, that is, the RBridges can reach the MAC address of the end system only through the other RBridges. Therefore, the conventional ESADI protocol cannot meet the requirement of Information sharing among the RBv members.

Although the introduction of an RBv group is mentioned in the related art, after the RBv group is introduced, the member RBridges must share acquired information such as the MAC address information to one another in the group to enable the members to better provide service for the end system, for example, when message forwarding service is provided for the end system across a TRILL network, unnecessary multicast forwarding of an unknown unicast message is avoided. At present, the prior art is unsuitable for intra-group information sharing such as MAC information sharing. In the TRILL network, a MAC address information format on an Edge RBridge is different from that in a conventional network (for example, the far-end MAC information additionally has a Nickname field of an egress RBridge), so that the problem of MAC address between RBvs cannot be solved by the prior art. The conventional ALAN-granularity-based ESADI cannot ensure to control a sharing range of the MAC address information and an OAM message within the group.

Figure 1:
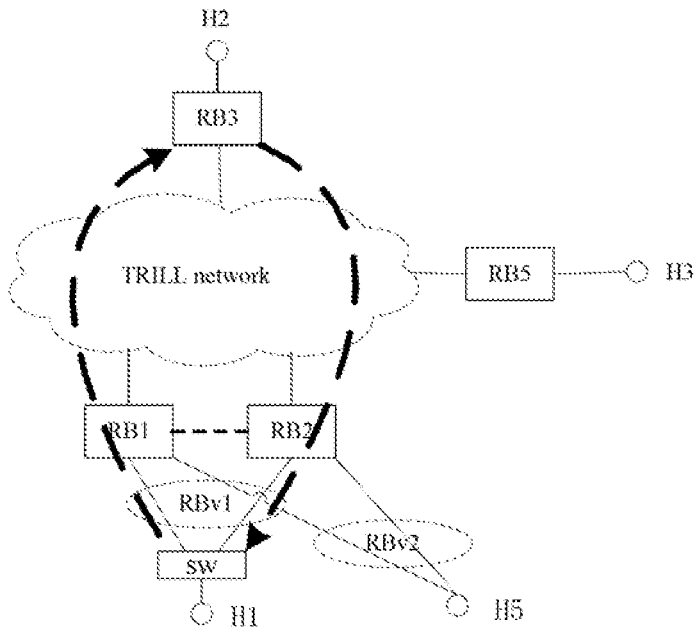
FIG. 1 is a schematic diagram of different forwarding paths of RBv members for messages between host computers according to a related art.
Figure 2:
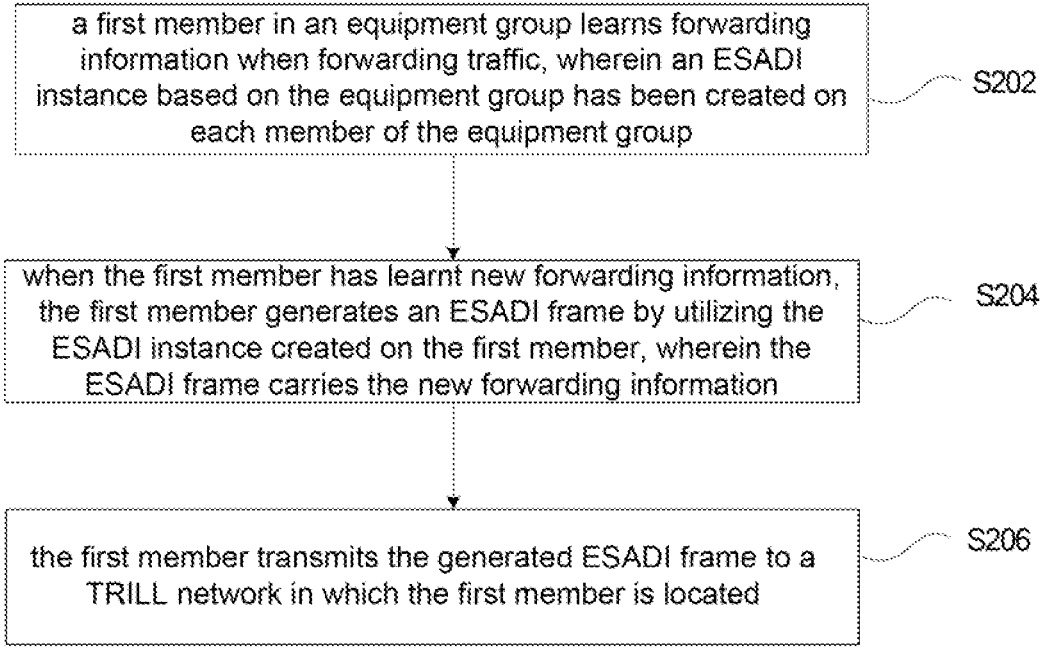
FIG. 2 is a processing flowchart of a first information processing method according to an embodiment of the invention.

In order to solve the above-mentioned technical problem, the embodiment of the invention provides an information processing method, FIG. 2 is a processing flowchart of a first information processing method according to an embodiment of the invention, and as shown in FIG. 2, the method includes that:

S202: a first member in an equipment group learns forwarding information when forwarding traffic, wherein an ESADI instance based on the equipment group has been created on each member of the equipment group;

S204: when the first member has learnt new forwarding information, the first member generates an ESADI frame by utilizing the ESADI instance created on the first member, wherein the ESADI frame carries the new forwarding information; and S206: the first member transmits the generated ESADI frame to a TRILL network in which the first member is located.

In the embodiment of the invention, the equipment-group-based ESADI instance rather than a VLAN-based ESADI instance mentioned in the related art is created on each member in the equipment group, the first member generates the ESADI frame by utilizing the ESADI instance created thereon after learning the forwarding information, and transmits the generated ESADI frame to the TRILL network, and the forwarding information learnt by the first member is flooded into the network for the other members in the equipment group to learn by virtue of the ESADI frame, so that the aim of sharing the forwarding information among all the members in the equipment group is fulfilled.

Preferably, after S206 is executed, namely the first member transmits the generated ESADI frame to the TRILL network where it is, and other members in the same equipment group with the first member receive the ESADI frame, and process the ESADI frame to learn the new forwarding information by virtue of the equipment-group-based ESADI instance created thereon. In the embodiment of the invention, the other members in the equipment group can learn the new forwarding information in the equipment group, so that the aim of sharing the forwarding information among the members in the equipment group is fulfilled.

In order to differentiate the VLAN-based ESADI instance mentioned in the related art from the equipment-group-based ESADI instance, during implementation, a specific ID is set in an inner frame header of the ESADI frame generated based on the equipment group, and is used for indicating that the ESADI frame generated based on the equipment group is only used for the group-based ESADI instance rather than the VLAN-based ESADI instance. The ESADI frame used below is the ESADI frame generated in the embodiment of the present invention, is generated based on the equipment-group-based ESADI instance, and is different from an ESADI frame in the related art. In order to facilitate description, the ESADI frame generated in the embodiment of the present invention is called as an ESADI instance for short.

In a preferred embodiment, a VLAN ID field in the frame header of the ESADI frame can be selected as the specific ID, and a value of the specific ID is 0xFFF (all 1) or 0x000 (all 0).

In addition, the ESADI frame can also carry an equipment group ID, wherein the equipment group ID is used for indicating that the payload information of the ESADI frame can be shared in the equipment group identified by the equipment group ID. That is, a range of the equipment group where the information is shared is indicated by the equipment group ID, so that the problems of information sharing process disorder, even information loss and the like, which are caused by unclear range of the equipment group, are solved.

During implementation, the amount of the new forwarding information is large, so that a storage rule of the new forwarding information can be defined, for example, a preferred storage manner is to store the new forwarding information in the payload information of the ESADI frame in a TLV format. In case of a change in a practical application, it is feasible to select a TYL manner, a VTL manner or other parameters for formatting storage according to a practical application condition.

According to any one of the above-mentioned preferred embodiments, preferably, the new forwarding information can include: MAC information and/or the OAM message. According to different actual conditions, the forwarding information can further include other information capable of being forwarded, and unnecessary details will not be given here.

A reason why the forwarding information includes the MAC address at present is that the conventional ESAI protocol distributes the MAC address information of the end system based on a VLAN granularity, and in order to isolate MAC information sharing among different VLANs, different ESADI instances are created in different VLANs. There are numerous Virtual Machines (VM) and physical servers with MAC addresses in a large DC, and although the VMs and the physical servers are divided based on the VLANs, the same VLAN can have numerous VMs and servers. In addition, the edge RBridge in the DC is usually linked with numerous VMs and physical servers as access equipment such as a Top of Rack (TOR) or an End of Row (EOR), and the VMs and the servers are distributed in different VLANs. Therefore, if the MAC information is shared among different RBridges in a VLAN-granularity-based ESADI manner, the member RBridges of an RBv need to create a great number of ESADI instances, and share all the MAC information in the VLAN with the other RBridges (even though not being RBv members) in the network in each VLAN, which causes MAC information overload on the member RBridges. Therefore, a MAC sharing mechanism based on a conventional VLAN-based ESADI protocol is unsuitable for information sharing among the RBv members, and needs to be improved and optimized.

A reason why the OAM message, besides the MAC information, needs to be shared in the group is that, for example, an improper Time To Live (TTL) value is filled in the TRILL header when RB1 (representing the RBv) encapsulates a message transmitted from H1 to H2 into a TRILL message, and has been reduced to be 0 by the previous RBridges when the TRILL message reaches RB3. Then RB3 needs to transmit the OAM message to the RBv to report the error, and discards the message. Under the condition that RB2 is closer to RB1, the message will be transmitted to RB2 (representing the RBv). However, because RB2 does not transmit the TRILL message, and does not know which member in the RBv transmitted the wrong TRILL message, if the OAM message is not shared in the group, RB1 cannot know the OAM message transmitted by RB3 as well as the mistaken filling of the TTL value.

When the new forwarding information is the MAC information, the ESADI protocol in the related art only allows the notification of the local MAC address, and the ESADI instance in the embodiment is based on the equipment group, so that the far-end MAC information, besides the local MAC information, can be shared among the RBv members and learnt by the members, that is, the RBridges can access the MAC information of the end system only through the other RBridges.

Moreover, when the new forwarding information is the MAC information, the first member can set an equipment ID field in the payload information to be a Nickname of the egress RBridge with the MAC information. If the Nickname is 0, the first member can directly reach the equipment represented by the MAC information without passing through the other RBridges.

When the new forwarding information is the OAM message, the first member can place the TRILL header in the OAM message and a subsequent content of the TRILL header in the payload information.

According to any one of the above-mentioned preferred embodiments, the equipment group can be the RBv, and can also be a logic unit consisting of multiple RBridges, depending on the actual condition.

Figure 3:
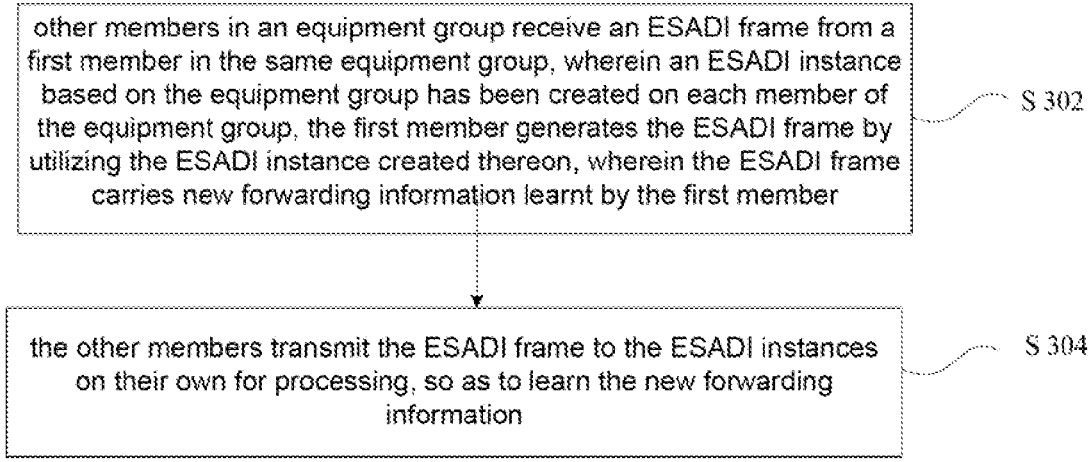
FIG. 3 is a processing flowchart of a second information processing method according to an embodiment of the invention.

The information processing method is described from the side of the first member which is the first one to learn the new forwarding information, and based on the same inventive concept, the embodiment of the present invention also provides another information processing method described from the side of the other members in the same equipment group with the first member. FIG. 3 is a processing flowchart of a second information processing method according to an embodiment of the present invention, and as shown in FIG. 3, the method includes that:

S302: other members in an equipment group receive an ESADI frame from a first member in the same equipment group, wherein an ESADI instance based on the equipment group has been created on each member of the equipment group, the first member generates the ESADI frame by utilizing the ESADI instance created thereon, wherein the ESADI frame carries new forwarding information learnt by the first member; and S304: the other members transmit the ESADI frame to the ESADI instances on their own for processing, so as to learn the new forwarding information.

As shown in FIG. 3, when S304 is implemented, the other members transmit the ESADI frame to the equipment-group-based ESADI instance for processing, and in order to ensure that the ESADI instance for processing the received ESADI frame can be accurately determined, the other members determine the equipment-group ESADI instance according to a specific ID and an equipment group ID in payload information in the ESADI frame, and transmit the ESADI frame to the determined ESADI instance for processing.

Figure 4:
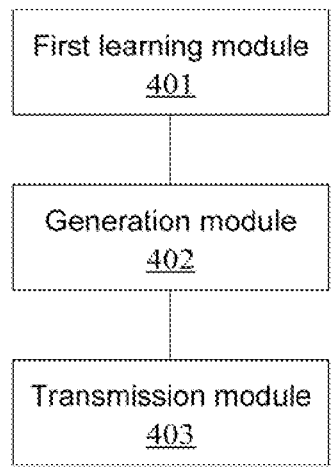
FIG. 4 is a structure diagram of a first information processing device according to an embodiment of the invention.

In order to support any one of the above-mentioned preferred embodiments, based on the same inventive concept, the embodiment of the invention also provides an information processing device, FIG. 4 is a structure diagram of a first information processing device according to an embodiment of the present invention, and as shown in FIG. 4, the device is located on a member in an equipment group, and an ESADI instance based on the equipment group is created on each member in the same equipment group, the device including:

a first learning module 401, configured to learn forwarding information when forwarding traffic;

a generation module 402, connected with the first learning module 401 and configured to, when the first learning module 401 learns new forwarding information, generate an ESADI frame by utilizing the ESADI instance created locally, wherein the ESADI frame carries the new forwarding information; and a transmission module 403, connected with the generation module 402 and configured to transmit the ESADI frame generated by the generation module to a TRILL network where it is.

Figure 5:
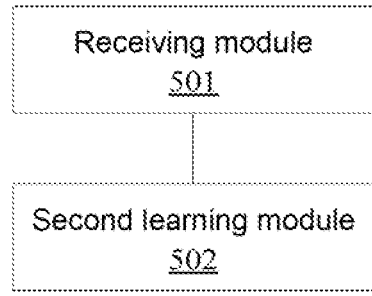
FIG. 5 is a structure diagram of a second information processing device according to an embodiment of the invention.

In order to support any one of the above-mentioned preferred embodiments, based on the same inventive concept, the embodiment of the present invention also provides an information processing device, FIG. 5 is a structure diagram of a second information processing device according to an embodiment of the present invention, and as shown in FIG. 5, the device is located on another member except a first member in an equipment group, and an ESADI instance based on the equipment group is created on each member in the same equipment group, the device including:

a receiving module 501, configured to receive an ESADI frame from the first member, wherein the first member generates the ESADI frame by utilizing the ESADI instance created thereon, and the ESADI frame carries new forwarding information learnt by the first member; and a second learning module 502, connected with the receiving module 501 and configured to transmit the ESADI frame to the equipment-group-based ESADI instance for processing to learn the new forwarding information.

Figure 6:
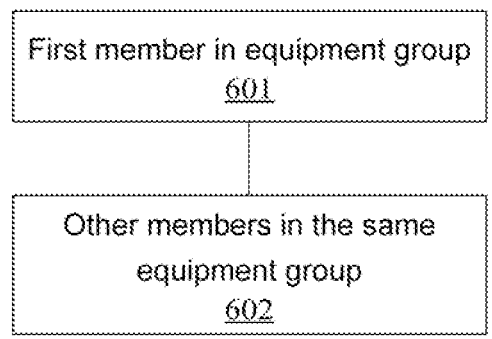
FIG. 6 is a structure diagram of an information processing system according to an embodiment of the invention.

In order to support any one of the above-mentioned preferred embodiments based on the same inventive concept, the embodiment of the invention also provides an information processing system, FIG. 6 is a structure diagram of an information processing system according to an embodiment of the invention, and as shown in FIG. 6, the system includes:

a first member 601 in an equipment group, configured to learn forwarding information when forwarding traffic, an equipment-group-based ESADI instance being created on each member in the equipment group, generate an ESADI frame by utilizing the ESADI instance created thereon when learning new forwarding information, the ESADI frame carrying the new forwarding information, and transmit the ESADI frame to a TRILL network where it is; and other members 602 in the same equipment group with the first member 601, configured to receive the ESADI frame from the first member 601 and transmit the ESADI frame to the equipment-group-based ESADI instance for processing to learn the new forwarding information.

From the above, a purpose of the embodiments of the invention is to provide a method for creating an ESADI instance (creating one ESADI instance for each group) for member equipment in an RBv group by taking a group as a unit and a method for sharing information among members in the group.

In order to make clearer the information processing methods provided by the embodiments of the present invention, the information processing methods are described with reference to specific embodiments.

Embodiment 1

The group-based ESADI instance for sharing information among the members of the equipment group is created on the members of the same equipment group. A flow mainly includes:

setting the specific ID in the inner-layer frame header of the ESADI frame, wherein the ESADI frame carrying the ID is not used for the VLAN-based ESADI instance;

expanding the ESADI frame to enable the ESADI frame to carry the equipment group ID for indicating that the payload information of the ESADI frame can be shared in the equipment group; and placing a message to be shared in the group in the payload information of the ESADI frame in the TLV format.

Specifically:

the VLAN ID in the inner-layer frame header of the ESADI frame is set into be a special value to indicate that the ESADI frame is not used for the VLAN-based ESADI instance any longer, for instance, effective bits in the ULAN ID are all set to be 1 or 0.

The Nickname information of the equipment group is carried in the payload information of the ESADI frame to indicate that the ESADI frame belongs to the equipment group; and after the ESADI frame is received, the other members in the equipment group locate the ESADI instance for processing the ESADI frame by virtue of the Nickname information, thereby realizing intra-group information sharing. The equipment group can be an RBv, and can also be a logic unit consisting of multiple RBridges.

For MAC address sharing, in the ESADI frame, the MAC information to be shared is placed in an MAC-Reachability TLV, a Nickname field in the TLV is set to be the Nickname of the egress RBridge corresponding to the MAC entry, and a frame transmitter shares a far-end MAC information bridge. Particularly, if the Nickname field in the TLV is 0, the frame transmitter can directly reach the equipment represented by the MAC information without passing through the other RBridges. For OAM message sharing, in the ESADI frame, the TRILL header and the subsequent content of the TRILL header in an original OAM message must be placed in the TLV.

Compared with the prior art, the embodiment has the advantages that:

after the RBv group is introduced, the member RBridges must share acquired information such as the MAC address information to one another in the group to enable the members to better provide service for the end system, for instance, when the message forwarding service is provided for the end system across the TRILL network, unnecessary multicast forwarding of the unknown unicast message is avoided. At present, the prior art is unsuitable for intra-group information sharing such as MAC information sharing. In the TRILL network, the MAC address information format on the Edge RBridge is different from that in the conventional network (for example, the far-end MAC information additionally has the Nickname field of the egress RBridge), so that the problem of MAC address between RBvs cannot be solved by the prior art. The conventional VLAN-granularity-based ESADI cannot ensure to control the sharing range of the MAC address information and the OAM message within the group. Based on the expansion of the conventional ESADI protocol, the embodiment of the present invention discloses a method for creating an RBG-based ESADI instance, and information such as the MAC address and the OAM message is shared among the RBv members in the group.

Embodiment 2

Figure 7:
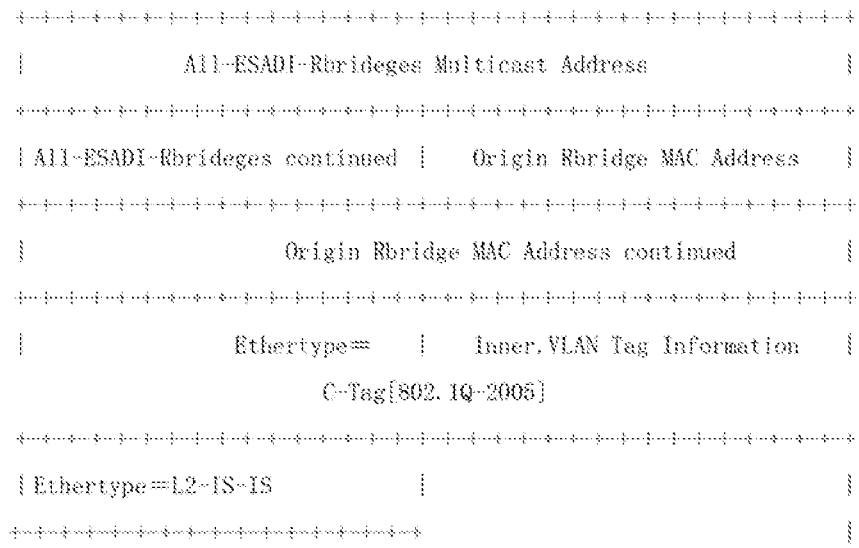
FIG. 7 is a structure diagram of an inner-layer frame header of an ESADI frame according to an embodiment of the invention.

FIG. 7 is a structure diagram of an inner-layer flame header of an ESADI frame according to an embodiment of the invention, and as shown in FIG. 7, in the frame structure, an Inner.VLAN Tag Information field carries a 12-bit VLAN ID. In the conventional ESADI protocol, the VLAN ID in the field must be an effective value, and indicates that information carried in an ESADI payload in the frame is only shared in the VLAN specified by the ID.

According to the embodiment of the present invention, the VLAN ID in the field is set to be a special value, for example, the reserved VLAN ID value 0xFFF or 0x000 indicates that the sharing range of the information carried in the ESADI payload of the frame is not the VLAN. An actual sharing range is further specified by the TLV in the payload.

Figure 8:
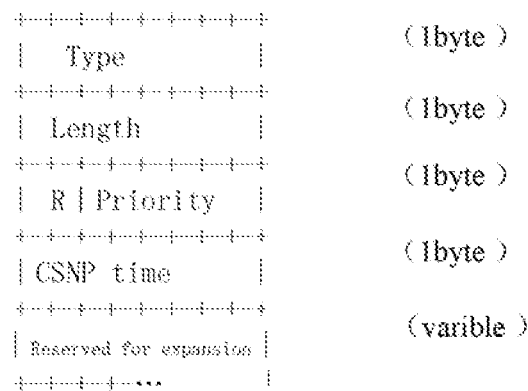
FIG. 8 is a structure diagram of ESADI parameter data TLV according to an embodiment of the invention.
Figure 9:
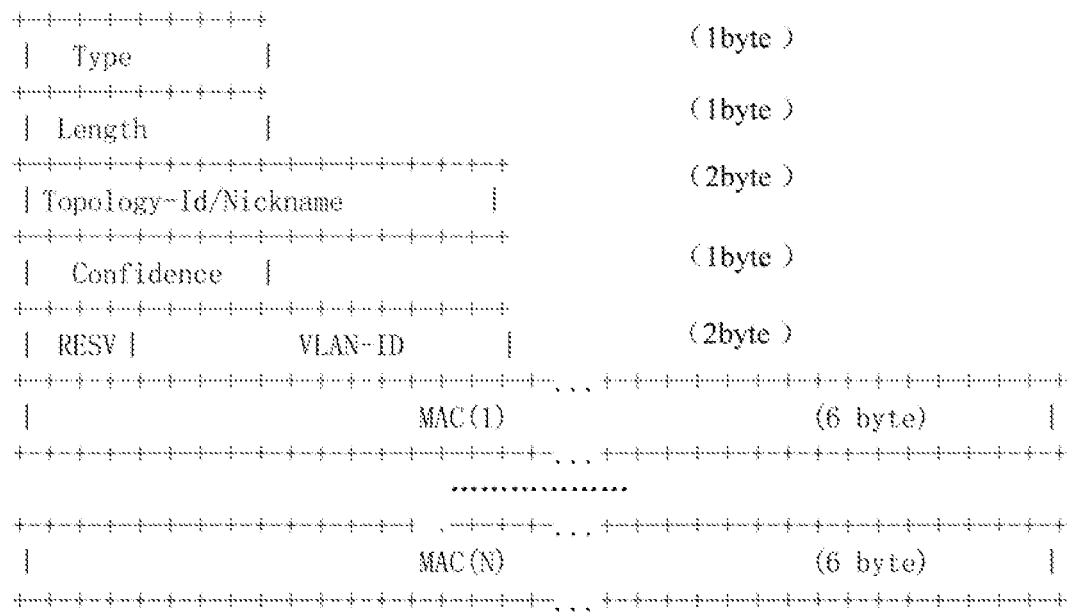
FIG. 9 is a diagram of an L2 MAC address information reachability TLV result according to an embodiment of the invention.

In the conventional ESADI protocol, there are only two TLVs related to the protocol in the ESADI payload: FIG. 8 is a structure diagram of ESADI parameter data TLV according to an embodiment of the invention, FIG. 9 is a diagram of an L2 MAC address information reachability TLV result according to an embodiment of the invention, and the two TLVs are, as shown in FIG. 8 and FIG. 9, the ESADI parameter data TLV (as shown in FIG. 8) and MAC reachability TLV (as shown in FIG. 9). The former indicates some parameters for selecting a Designated RBridge (DRB) from the ESADI RBridges sharing information and controlling information synchronization among the ESADI RBridges sharing the information. The latter includes the shared MAC information.

According to the embodiment of the invention, the information carried in the payload of the ESADI frame is further specified to be shared among the designated RBv members in a way of including the Nickname information (or including a sub-TLV of the Nickname information) of the RBv in a reserved for expansion field of the former TLV. Besides the TLV including the Nickname information of the RBv being placed in the reserved for expansion field, the TLV can also be directly placed in the payload, and likewise, the sharing range of the information in the payload can be designated to be the RBv members.

In the conventional ESADI protocol, the VLAN with the shared MAC address is specified by the VLAN ID in the inner-layer frame header of the ESADI frame. When the VLAN ID in the frame header is different from that in the MAC information in the payload, the former is taken as a reference, and the latter is ignored, that is, the MAC address belongs to the VLAN specified by the frame header. Therefore, the MAC information in only one VLAN can be shared by one ESADI frame.

In the embodiment of the present invention, the VLAN corresponding to the MAC entry is completely specified by the VLAN ID of the entry, and when the VLAN corresponding to the MAC entry is judged, the VLAN ID information in the inner-layer frame header is ignored (because the VLAN ID is an ineffective value). Therefore, the MAC information in multiple VLANs can be shared by one ESADI frame.

In the conventional ESADI protocol, an ESADI frame generation RBridge can only place the local MAC address (namely the transmitter can directly reach the MAC address of the end system without passing through the other RBridges) in the payload of the ESADI frame for sharing, so that the Nickname field in the MAC-Reachability TLV is usually set to be 0 or ignored by a receiver.

In the embodiment of the present invention, besides the local MAC address, far-end MAC information learnt by the transmitter can be shared (namely the transmitter can reach the MAC address of the end system only through the other RBridges). The Nickname (i.e. the Nickname of the egress RBridge, recorded as Egress_Nickname) information of the RBridge (including the RBv) of the final hop reaching the far-end MAC address is placed in the Nickname field in the TLV. At the receiver of the ESADI frame, if the Nickname in the received MAC-Reachability TLV is not 0, the end system represented by the MAC address can be finally reached through the RBridge represented by the Nickname, and the Nickname is not ignored.

Embodiment 3

The embodiment takes FIG. 7 as an example, and embodiment 3 is taken as an example for describing an address haring process of RB1 d RB2 in the RBv.

In the embodiment, the MAC addresses of H1 and H2 are MAC1 and MAC2 in VLAN1 respectively. H1 and H2 transmit data frames to each other, the frame from H1 to H2 enters the TRILL network after being processed (TRILL encapsulation) by RB1 and finally reaches H2 after being processed (TRILL decapsulation) by RB3. The frame from H2 to H1 reaches H1 after being processed by RB3 and RB2. By a self-learning mechanism, RB1 learns about that MAC1 exists in local VLAN1; and RB2 learns about that MAC2 exists in the far-end VLAN1 and MAC2 can be reached through RB3.

A process of sharing MAC1 and MAC2 in the RBv by RB1 and RB3 is described blow.

S1: an ESADI instance relevant with the RBv is configured and enabled on RB1 and RB2 respectively;

S2: after RB1 learns local MAC1 information, the ESADI instance on RB1 encapsulates an ESADI frame, a VLAN ID of an inner-layer frame header of the frame is 0xFFF, a reserved for expansion field of ESADI parameter data TLV in an ESADI payload carrying the Nickname of the RBv, generates MAC-Reachability TLV including the MAC1 information, and places the MAC-Reachability TLV in the ESADI payload, wherein, in the MAC-Reachability TLV, a MAC field is MAC1, a VLAN ID field is 1 and a Nickname field is the Nickname of the RBv;

S3: the ESADI instance on RB1 floods the ESADI frame into the TRILL network, thereby ensuring that all RBridges can receive the ESADI frame;

S4: after receiving the ESADI frame, RB3 finds that the VLAN ID in the inner-layer frame header is 0xFFF, and discards the frame because RB3 only realize a VLAN-based ESADI function or does not enable an ESADI function;

S5: after receiving the frame, RB2 finds that the VLAN ID in the inner-layer frame header is 0xFFF, further processes the frame because RB2 enables the ESADI instance on the RBv, parses the Nickname of the RBv from the reserved for expansion field of the ESADI parameter data TLV in the payload of the frame, and processes the frame by virtue of the ESADI instance associated with the RBv;

S6: the ESADI instance associated with the RBv on RB2 learns about that MAC1 can be reached through the RBv by parsing the MAC-Reachability TLV in the payload, thereby locally establishing a forwarding entry of MAC1; and S7: when receiving a TRILL data frame transmitted from RB3 to H1 behind the RBv, RB2 decapsulates the TRILL data frame into an original data frame and transmits the original data frame to H1 because RB2 is one of members of the RBv.

Within the range of the RBv, a flow of sharing a far-end MAC address MAC by RB2 and RB1 is similar to the above-mentioned flow, and a difference is that, when RB2 generates the ESADI frame, the MAC field in the MAC-Reachability TLV in the payload is MAC2 and the Nickname field is the Nickname of RB3. After receiving the ESADI frame, RB1 can learn about that MAC2 can be reached through RB3.

Embodiment 4

In the embodiment, it is supposed that N transmission RBridges exist from RB1 to RB3; the frame from H1 to H2 enters the TRILL network after being processed (RB1 representing the RBv performs TRILL encapsulation on the ESADI frame, Egress in the TRILL header is RB2 and the Ingress is the RBv), and finally reaches RB3. For some reason, when RB1 performs TRILL encapsulation on the frame of H1, the TTL filled in the TRILL header is less than N (N is supposed to be greater than 255, and exceeds a permissible maximum value of the TTL). Therefore, the TTL has been reduced to be 0 (the TTL in the message will be reduced by 1 every time when the message passes through an RBridge in a transmission process from RB1 to RB3) when the TRILL-encapsulated message reaches RB3, and RB3 will consider the message as an illegal TRILL message and discard the message. Before discarding the message, RB3 transmits an OAM message to the RBv to report the error. However, the discarded message is not imported into the TRILL network by RB2, and RB2 only knows that the message is imported by a certain member in the RBv group, but does not know the specific one. Therefore, RB2 needs to share the OAM message in the RBv group. A sharing process is as follows:

S1: after receiving the OAM message, RB2 parses the OAM message, finds that the message with the error is not generated by itself, and generates an ESADI frame by virtue of the ESADI instance created for the RBv;

S2: the VLAND ID in the inner-layer frame header of the frame is 0xFFF, and the Nickname TLV including the Nickname of the RBv is placed in the payload of the ESADI frame; the TRILL header and the subsequent content in the OAM message are placed in OAM information sharing TLV, and transmits the encapsulated ESADI frame;

S3: after receiving the ESADI frame, RB3 finds that the VLAN ID in the inner-layer frame header is 0xFFF, and discards the frame because RB3 only realize a VLAN-based ESADI function or does not enable an ESADI function;

S4: after receiving the frame, RB1 finds that the VLAN ID in the inner-layer frame header is 0xFFF, further processes the frame because RB2 enables the ESADI instance on the RBv, parses the Nickname of the RBv from the reserved for expansion field of the ESADI parameter data TLV in the payload of the frame, and processes the frame by virtue of the ESADI instance associated with the RBv; and S5: the ESADI instance associated with the RBv on RB1 acquires the OAM message by parsing the OAM message TLV in the payload, and transmits the OAM message to an OAM message processing module for further processing.

By the above-mentioned intra-group information sharing mechanism, RB1 can know a reason for the error and perform processing after receiving the DAM message from RB3.

According to the ESADI-based intra-equipment group information sharing mechanism provided by the embodiment of the invention, other information can also be shared in the group by carrying TLV in other formats in the ESADI payload.

From the above, it can be seen that the invention achieves the technical effects that:

in the embodiments of the invention, the equipment-group-based ESADI instance rather than the ULAN-based ESADI instance mentioned in the related art is created on each member in the equipment group, the first member generates the ESADI frame by utilizing the ESADI instance created thereon after learning the forwarding information, and transmits the generated ESADI frame to the TRILL network, and the forwarding information learnt by the first member is flooded into the network for the other members in the equipment group to learn by virtue of the ESADI frame, so that the aim of sharing the forwarding information among all the members in the equipment group is fulfilled.

Obviously, a technician of the field should know that each module or step of the invention can be implemented by a universal computing device, and the modules or steps can be concentrated on a single computing device or distributed on a network formed by a plurality of computing devices, and can optionally be implemented by programmable codes executable for the computing devices, so that the modules or steps can be stored in a storage device for execution with the computing devices, or can form each integrated circuit module, or multiple modules or steps therein can form a single integrated circuit module for implementation. As a consequence, the invention is not limited to any specific hardware and software combination.

The above is only the preferred embodiment of the invention and not intended to limit the invention, and the technician of the field can make various modifications and variations to the invention. Any modifications, equivalent replacements, improvements and the like within the principle of the invention shall fall within the scope of protection of the invention.

What is claimed is:

1. A method for processing information, comprising:
   a first member in an equipment group learning forwarding information when traffic is forwarded, wherein an End Station Address Distribution Information (ESADI) instance based on the equipment group has been created on each member in the equipment group;
   when the first member has learnt new forwarding information, the first member generating an ESADI frame by utilizing the ESADI instance created on the first member, wherein the ESADI frame carries the new forwarding information, and the new forwarding information comprises far-end MAC address information, and a specific Identifier (ID) is set in the frame header of the ESADI frame and is configured to indicate that the ESADI frame is only configured for the group-based ESADI instance; and
   the first member transmitting the ESADI frame to a Transparent Interconnection over Lots of Links (TRILL)-network in which the first member is located.

2. The method according to claim 1, after the first member transmitting the ESADI frame to a Transparent Interconnection over Lots of Links (TRILL) network in which the first member is located, further comprising:

other members in the same equipment group with the first member in the TRILL network receiving the ESADI frame; and the other members processing the ESADI frame to learn the new forwarding information according to the ESADI instance based on the equipment.

3. The method according to claim 2, wherein the new forwarding information is stored in the payload information of the ESADI frame in a Type-Length-Value (TLV) format.

4. The method according to claim 2, wherein the equipment group is a Virtual Routing Bridge, or a logic unit consisting of a plurality of Routing Bridges.

5. The method according to claim 1, wherein a value of the specific ID is 0xFFF or 0x000 when the specific ID is a Virtual Local Area Network (VLAN) ID field in the frame header of the ESADI frame.

6. The method according to claim 1, wherein the ESADI frame carries an equipment group ID, and the equipment group ID is configured to indicate that the payload information of the ESADI frame can be shared in the equipment group identified by the equipment group ID.

7. The method according to claim 1, wherein the new forwarding information is stored in the payload information of the ESADI frame in a Type-Length-Value (TLV) format.

8. The method according to claim 7, wherein the new forwarding information comprises: Media Control Access (MAC) information and/or an Operation Administration Maintenance (OAM) message.

9. The method according to claim 8, wherein the first member sets an equipment ID field in the payload information to be a Nickname of an egress of a Routing Bridge (RBridge) over which the MAC information is output when the new forwarding information is the MAC information.

10. The method according to claim 9, wherein the first member directly reaches the equipment represented by the MAC information without passing through the other RBridges when the Nickname is 0.

11. The method according to claim 10, wherein the first member puts a TRILL header and a subsequent content of the TRILL header in the OAM message in the payload information when the new forwarding information is the OAM message.

12. The method according to claim 1, wherein the equipment group is a Virtual Routing Bridge, or a logic unit consisting of a plurality of Routing Bridges.

13. A method for processing information, comprising:
receiving, by other members in an equipment group, an End Station Address Distribution Information (ESADI) frame from a first member in the same equipment group, wherein an ESADI instance based on the equipment group is created on each member in the equipment group, and the ESADI frame is generated by the first member by utilizing the ESADI instance created on the first member, and the ESADI frame carries new forwarding information learnt by the first member, and the new forwarding information comprises far-end MAC address information, and a specific Identifier (ID) is set in the frame header of the ESADI frame and is configured to indicate that the ESADI frame is only configured for the group-based ESADI instance; and transmitting, by the other members, the ESADI frame to the ESADI instance based on the equipment group for processing to learn the new forwarding information.

14. The method according to claim 13, wherein transmitting, by the other members, the ESADI frame to the ESADI instance based on the equipment group for processing comprises:

determining, by the other members, the ESADI instance based on the equipment group according to a specific Identifier (ID) and an equipment group ID in payload information in the ESADI frame; and transmitting, by the other members, the ESADI frame to the determined ESADI instance for processing.

15. A device for processing information, located on a member in an equipment group, and an End Station Address Distribution Information (ESADI) instance based on the equipment group has been created on each member in the same equipment group, the device comprising:

a first learning module, configured to learn forwarding information when forwarding traffic;

a generation module, configured to, when the first learning module has learnt new forwarding information, generate an ESADI frame by utilizing the ESADI instance created locally, wherein the ESADI frame carries the new forwarding information, and the new forwarding information comprises far-end MAC address information, and a specific Identifier (ID) is set in the frame header of the ESADI frame and is configured to indicate that the ESADI frame is only configured for the group-based ESADI instance; and a transmission module, configured to transmit the ESADI frame generated by the generation module to a Transparent Interconnection over Lots of Links (TRILL) network in which the first member is located.

16. A device for processing information, located on other members except a first member in an equipment group, an End Station Address Distribution Information (ESADI) instance based on the equipment group has been created on each member in the same equipment group, the device comprising:

a receiving module, configured to receive an ESADI frame from the first member, wherein the first member generates the ESADI frame by utilizing the ESADI instance created on the first member, and the ESADI frame carries new forwarding information learnt by the first member, and the new forwarding information comprises far-end MAC address information, and a specific Identifier (ID) is set in the frame header of the ESADI frame and is configured to indicate that the ESADI frame is only configured for the group-based ESADI instance; and a second learning module, configured to transmit the ESADI frame to the ESADI instance based on equipment group for processing to learn the new forwarding information.

17. A system for processing information, comprising:
a first member in an equipment group, configured to learn forwarding information when forwarding traffic, wherein an End Station Address Distribution Information (ESADI) instance based on the equipment group has been created on each member in the equipment group, and generate an ESADI frame by utilizing the ESADI instance created on the first member when learning new forwarding information, wherein the ESADI frame carries the new forwarding information, and the new forwarding information comprises far-end MAC address information, and a specific Identifier (ID) is set in the frame header of the ESADI frame and is configured to indicate that the ESADI frame is only configured for the group-based ESADI instance, and transmit the ESADI frame to a Transparent Interconnection over Lots of Links (TRILL) network in which the first member is located; and other members in the same equipment group with the first member, configured to receive the ESADI frame from the first member and transmit the ESADI frame to the ESADI instance based on the equipment group for processing to learn the new forwarding information.

* * * * *